United States Patent
Hyatt et al.

(10) Patent No.: US 10,145,190 B1
(45) Date of Patent: Dec. 4, 2018

(54) SUCTION PORT AND CHECK VALVE ASSEMBLY

(71) Applicant: Pipe Line Unique Services LLC, Humble, TX (US)

(72) Inventors: Robert Rinehart Hyatt, Humble, TX (US); George William Hyatt, Wellington, OH (US)

(73) Assignee: Pipe Line Unique Services LLC, Humble, TX (US)

( * ) Notice: Subject to any disclaimer, the term of this patent is extended or adjusted under 35 U.S.C. 154(b) by 0 days.

(21) Appl. No.: 15/659,171

(22) Filed: Jul. 25, 2017

(51) Int. Cl.
*E21B 21/01* (2006.01)
*F04B 53/10* (2006.01)
*B01D 35/153* (2006.01)
*E21B 21/10* (2006.01)
*B01F 15/02* (2006.01)

(52) U.S. Cl.
CPC ............ *E21B 21/01* (2013.01); *B01D 35/153* (2013.01); *E21B 21/106* (2013.01); *F04B 53/109* (2013.01); *B01F 15/0243* (2013.01); *F04B 53/1087* (2013.01); *Y10T 137/7912* (2015.04)

(58) Field of Classification Search
CPC ...... E21B 21/01; E21B 21/106; F04B 53/109; F04B 53/1087; B01D 35/153; B01F 15/0243; Y10T 137/7912
See application file for complete search history.

(56) References Cited

U.S. PATENT DOCUMENTS

| | | | | |
|---|---|---|---|---|
| 3,620,653 A | * | 11/1971 | Gaylord | F04B 53/1002 137/515.5 |
| 3,746,263 A | * | 7/1973 | Reeder | A01G 25/023 137/270 |
| 6,334,463 B1 | * | 1/2002 | Lee | E03C 1/0404 137/360 |
| 6,450,787 B1 | * | 9/2002 | Risch | B60T 8/4031 417/569 |
| 7,021,911 B2 | * | 4/2006 | Moradmand | F04B 1/0404 417/273 |
| 7,661,871 B2 | | 2/2010 | Hyatt et al. | |
| 7,950,910 B2 | * | 5/2011 | Miller | F04B 1/0408 137/512.1 |

* cited by examiner

*Primary Examiner* — William McCalister
*Assistant Examiner* — Patrick Williams
(74) *Attorney, Agent, or Firm* — Head, Johnson, Kachigian & Wilkinson, PC

(57) ABSTRACT

A suction port and check valve assembly for use with a pump head. The assembly comprises a port body and a check valve. The port body may have an inlet side, an outlet side, and a top, and may comprise a horizontal bore extending from the inlet side to the outlet side and a vertical bore extending from the top to the horizontal bore. The check valve may comprise a valve seat, where the valve seat rests atop the port body with only a gasket therebetween, and a valve body atop the valve seat. The port body may attach to the pump head via alignment spacers, such as springs, minimizing misalignment and resulting leaks.

6 Claims, 4 Drawing Sheets

US 10,145,190 B1

SUCTION PORT AND CHECK VALVE ASSEMBLY

CROSS REFERENCE

Not Applicable.

BACKGROUND OF THE INVENTION

Field of the Invention

This invention relates generally to the field of apparatuses and methods for storing, mixing, metering, and pumping polymeric slurry chemicals, and more particularly, but not by way of limitation, to a drag reducing agent suction port and check valve assembly.

Description of the Related Art

U.S. Pat. No. 7,661,871 issued Feb. 16, 2010 to Hyatt et al. addressed the issue of storing, mixing, metering, and pumping polymeric slurries by providing a storage and pumping unit for polymeric slurries that overcame the deficiencies of prior art devices. The inventor of the '871 Patent, also the inventor of the present invention, has improved upon the device set forth in the '871 Patent. The '871 Patent is incorporated herein by reference.

In a Milton Roy pump, drag reducing agent (DRA) is introduced into the pump through a single entry port located below the suction check valve. This creates a condition whereby the DRA is introduced to the pump by way of a dead-end line. As such, plugging ensues.

Based on the foregoing, it is desirable to provide a circulation system that enhances the suction port configuration of the '871 Patent that promotes a thorough flush of DRA product through the port and into the suction check valve.

It is further desirable for this system to eliminate piping deadlegs or blind tubing runs.

It is further desirable for this system to minimize the plugging that is so common with drag reducer.

It is further desirable to provide an improved check valve that minimizes plugging, minimize seal failure, and increase efficiency.

SUMMARY OF THE INVENTION

In general, in a first aspect, the invention relates to a suction port and check valve assembly for use with a pump head. The assembly comprises a port body and a check valve. The port body may have an inlet side, an outlet side, and a top, and may comprise a horizontal bore extending from the inlet side to the outlet side and a vertical bore extending from the top to the horizontal bore. The check valve may comprise a valve seat, where the valve seat rests atop the port body with only a gasket therebetween, and a valve body atop the valve seat.

The suction port and check valve assembly may further comprise an adapter atop the valve body. The adaptor and the valve body may be separate components with a gasket therebetween, or may be integrally formed such that they are a single structural component. The check valve may not comprise an adaptor between the valve seat and the port body.

The suction port and check valve assembly may attache to the pump head via a plurality of all thread rods extending downward from the pump head, the assembly further comprising a plurality of holes in the port body through which the all thread rods extend, a plurality of nuts threadably attached to the all thread rods below the port body to hold the port body in place relative to the pump head, and a plurality of alignment spacers capable of spacing the port body from the pump head such that the port body is properly aligned relative to the pump head. Specifically, the alignment spacers may be springs surrounding the all thread rods between the port body and the pump head.

The horizontal bore of the port body may have a smaller diameter at the outlet side than at the inlet side. Specifically, the port body may comprise a shoulder in the horizontal bore located between the vertical bore and the outlet side.

DETAILED DESCRIPTION OF THE INVENTION

Figure 1:
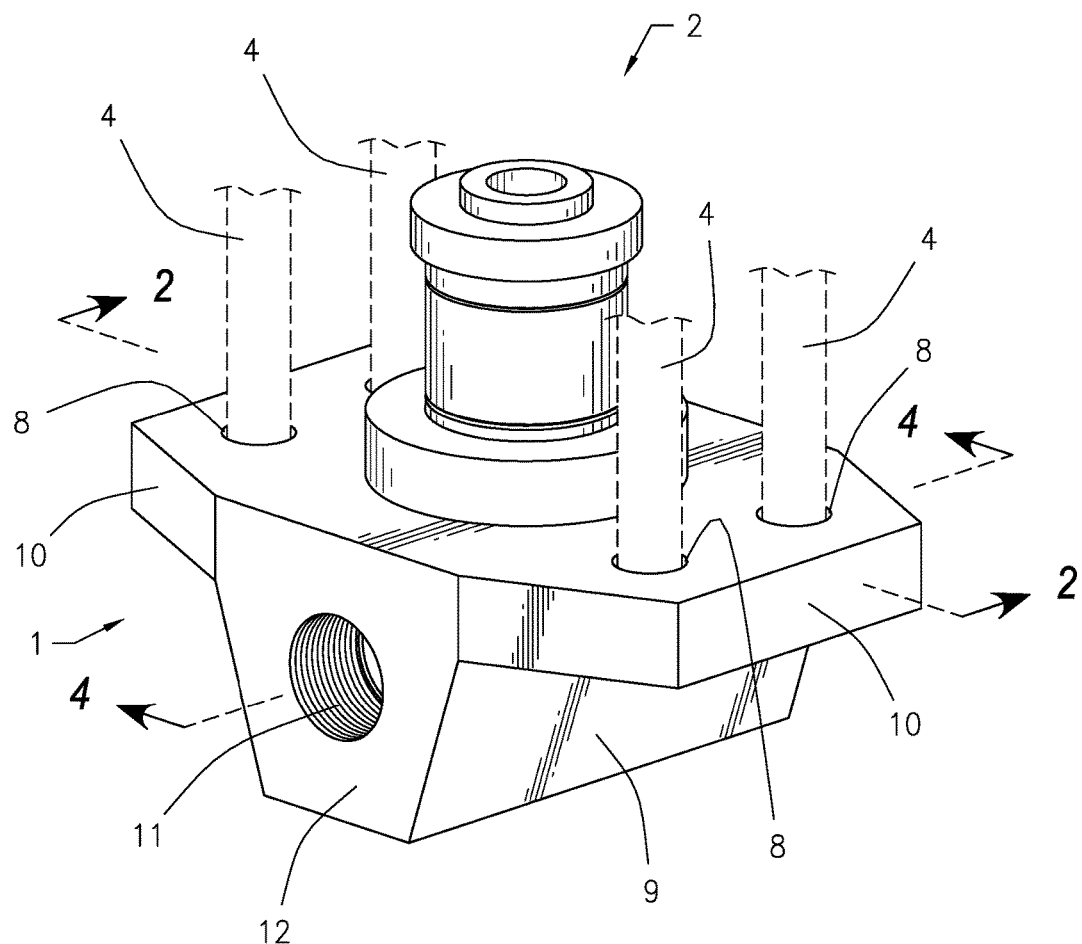
FIG. 1 is a perspective view of the present invention.
Figure 2:
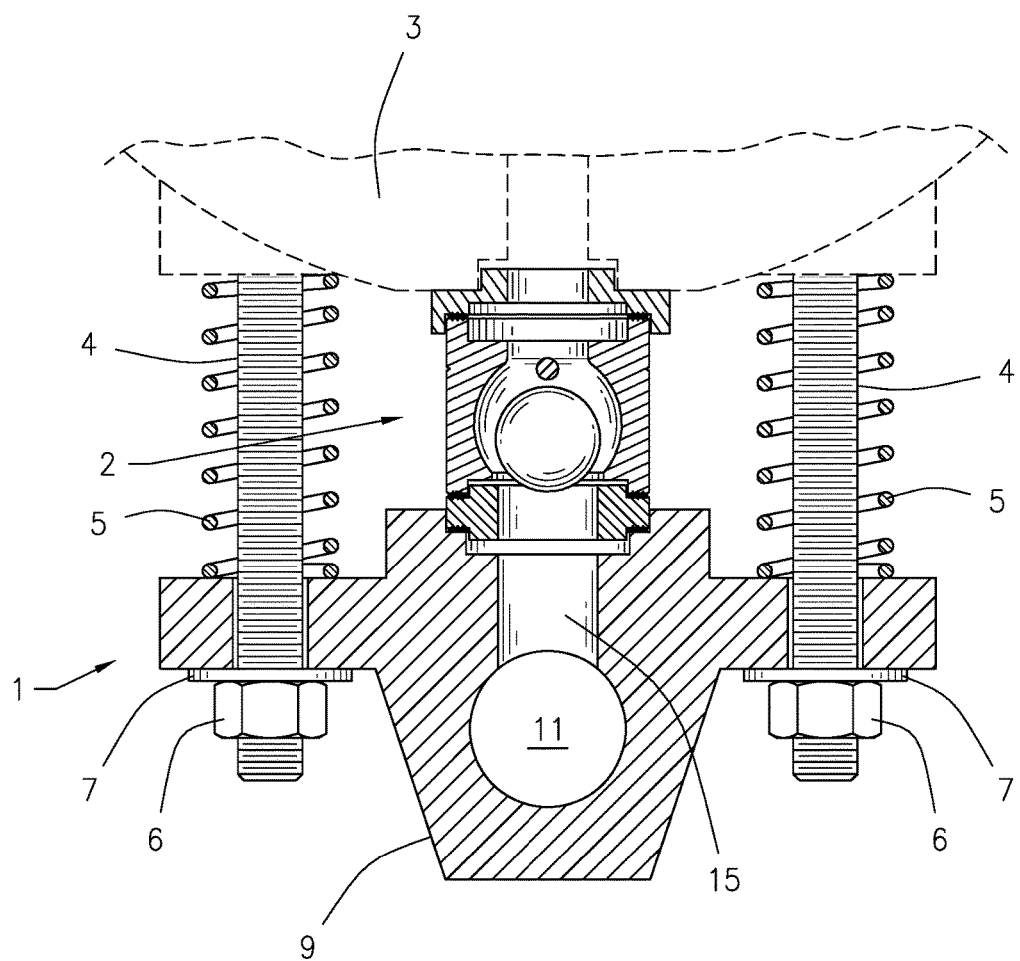
FIG. 2 is a side sectional view of the present invention.
Figure 3:
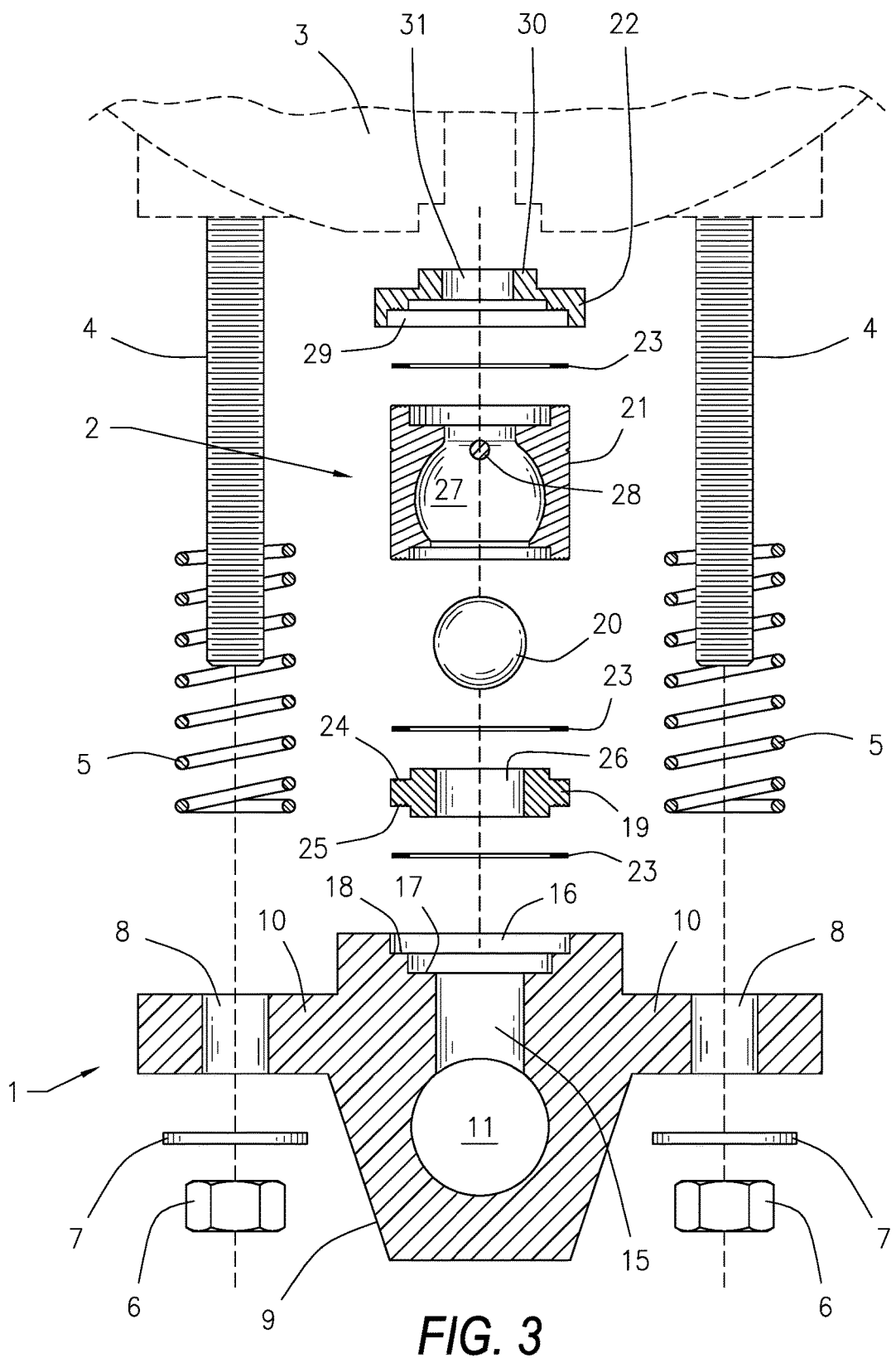
FIG. 3 is an exploded side sectional view.
Figure 4:
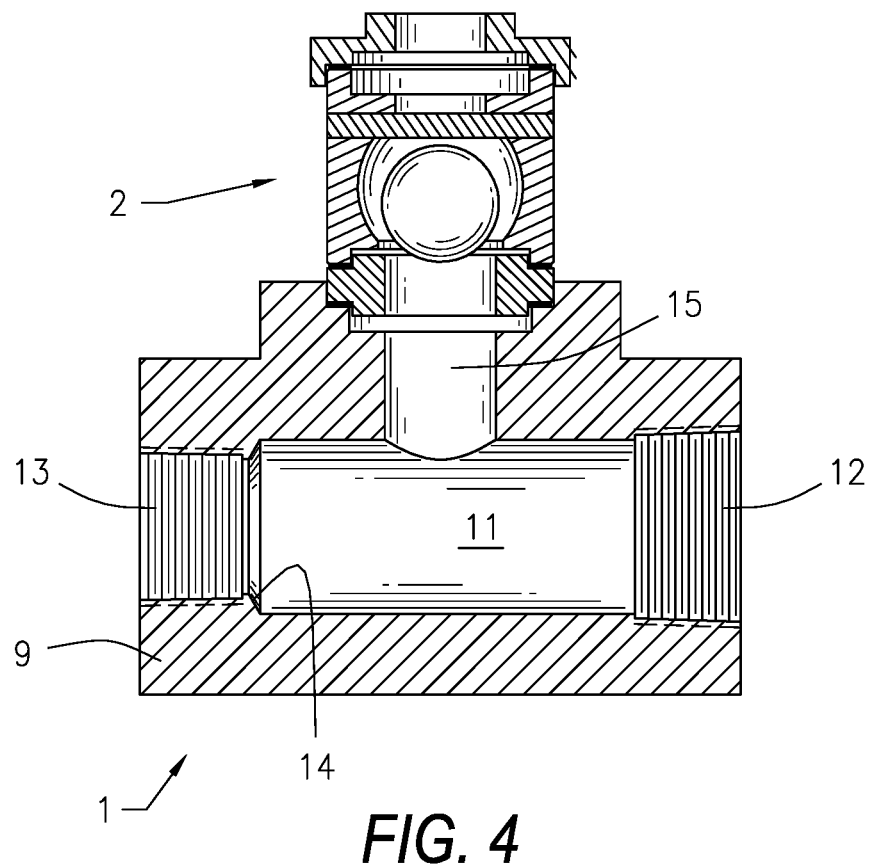
FIG. 4 is a top sectional view of the present invention.
Other advantages and features will be apparent from the following description and from the claims.

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a circulation system that enhances the suction port configuration of the '871 Patent to promote a complete and thorough flush of DRA product through the port and into the suction check valve. This enhancement may eliminate piping deadlegs or blind tubing runs, which may greatly minimize the plugging that is so common with drag reducer. The present invention may be used to adapt the suction port of a Milton Roy injection pump so that the suction side circulation of the DRA enters from one side of the port and exits 180 degrees to the other side. This port may be located directly below the suction check valve on the pump. The present design may provide a continuous flushing of the DRA under the check valve, thus eliminating the deadleg and minimizing the plugging of DRA.

As seen in the drawings, the suction port and check valve assembly may comprise a port body 1 and a check valve 2. The assembly may connect to a pump head 3 via a plurality of all thread rods 4. The all thread rods 4 may each have an alignment spacer 5, such as a spring as shown or any other desired alignment spacer, which acts as a spacer and aligns the port body 1 during installation. The all thread rods 4 may be held in place by nuts 6 and washers 7, or any other desired attachment device. The all thread rods 4 may extend through holes 8 in the port body 1 and into the pump head 3, with the nuts 6 and washers 7 located on the underside of the port body 1 and the alignment spacer 5 located between the port body 1 and the pump head 3. When the alignment spacer 5 is a spring, the spring may turn with the all thread rod 4 during installation until it hits the pump head 3, at which point it may stop turning and start compressing. This may signal the installer to stop turning, as the port body 1 is in the correct position. When all four alignment spacers 5 are the same size, the installer is thus assured the port body 1 is correctly aligned.

The port body 1 may have a central portion 9 with two flanges 10 extending laterally outward from the central portion 9. The holes 8 may be located in the flanges 10, as shown. The central portion 9 of the port body 1 may have a horizontal bore 11 extending all the way through, from the inlet side 12 to the outlet side 13. The bore 11 may have a shoulder 14 located between the inlet side 12 and the outlet side 13, making the bore at the outlet side 13 smaller that the bore at the inlet side 12. The face 14 may be tapered to reduce polymer buildup.

A vertical bore 15 may extend from the top of the central portion 9 of the port body 1 to the horizontal bore 11, such that the vertical bore 15 is in fluid communication with the horizontal bore 11. The face 14 discussed above may be located between the junction between the vertical bore 15 and the horizontal bore 11 and the outlet side 13, thus increasing pressure and forcing fluid upward through the vertical bore 15, through the valve 2, and into the pump head 3. The top of the port body 1 may have a two-step recess 16 surrounding the vertical bore 15 for receiving the check valve 2, with the two-step recess 16 forming a first shoulder 17 adjacent the vertical bore 15 and a second shoulder 18 upon which the check valve 2 may rest.

The check valve 2 may comprise a valve seat 19, a ball 20, a body 21, an adaptor 22, and gaskets 23. The valve seat 19 may have a top shoulder 24 and a bottom shoulder 25. The valve seat 19 may be partially receivable within the recess 16 of the port body 1, such that the bottom shoulder 25 rests on the second shoulder 18. A gasket 23 may be located between the bottom shoulder 25 and the second shoulder 18. The bottom of the valve seat 19 may not actually touch the first shoulder 17 of the port body 1, but rather may be suspended within the recess 16 by the bottom shoulder 25 and the second shoulder 18. The valve seat 19 may have a central bore 26 extending therethrough, where the central bore 26 of the valve seat 19 may align with the vertical bore 15 of the port body 1 when the valve seat 19 is in place within the recess 16. Specifically, the central bore 26 may have the same diameter as the vertical bore 15, thus minimizing possible points of accumulation of the polymer. Both the top and the bottom of the valve seat 19 may have a very small bevel, which may make the edges less likely to nick than if they were knife edges. The valve seat 19 may be entirely symmetrical, with the top and bottom identical. Thus, if the bottom of the valve seat 19 were to nick, wear, or otherwise become damaged, the valve seat 19 may be flipped upside down for a fresh seating surface rather than being immediately replaced.

The body 21 may rest atop the valve seat 19, with a gasket 23 located therebetween. Alternately, the body 21 and the valve seat 19 may be integrally formed, such that they are a single structural element. The body 21 may have an open interior 27, where the interior 27 is open to both the top and bottom of the body 21. The ball 20 may lie within the body 21, where it may be supported by the valve seat 19. The ball 20 may have a larger diameter than the central bore 26 of the valve seat 19 but may be smaller than the interior 27 of the body 21 of the check valve, allowing liquid to flow upward from the port body 1, through the check valve 2, and into the pump head 3 but not allowing liquid to return downward from the pump head 3 to the port body 1. A pin 28 may be located near the top of the open interior 27, preventing the ball 20 from blocking the opening between the interior 27 and the top of the body 21.

The adaptor 22 may be located between the body 21 and the pump head 3. The top of the body 21 may fit within a recess 29 in the adaptor 22, with a gasket 23 located between the top of the body 21 and the adaptor 22 and another gasket 23 located between the top of the adaptor 22 and the pump head 3. Alternately, the body 21 and the adaptor 22 may be integrally formed, such that they are a single structural element with no gasket therebetween. The top of the adaptor 22 may have a projection 30 that fits within an opening in the bottom of the pump head 3. The adaptor 22 may have a central bore 31 therethrough, allowing liquid to flow from the body 21 to the pump head 3.

The valve seat 19, ball 20, body 21, and/or adaptor 22 may be made of the same material or material with the same or similar hardness or other desired material. The gaskets 23 may be made of Teflon or other desired material. All surfaces touching gaskets 23 may optionally have serrated grooves for gripping the gaskets 23.

The entire check valve assembly 2 may be held in place by being compressed between the port body 1 and the pump head 3. During installation, the pieces may be stacked and the port body 1 and check valve 2 may be lifted into place with the top of the adaptor 22 in the opening in the bottom of the pump head 3 and the all thread rods 4 extending through the holes 8 in the flanges 10 of the port body 1, and then the nuts 6 may be tightened just until the springs 5 begin to compress. Tubing may then be attached to both the inlet side 12 and the outlet side 13 of the port body 1, such as via adaptors, and the tubing may be attached to a storage tank with a circulating pump.

The liquid pathway through the port body may begin with a certain inlet diameter, then gradually expand to a larger diameter at a center point of the port, then neck back down to the original inlet diameter at an outlet of the port. This enlargement of the hole through the port, then reduction as it exits, may produce a backpressure that forces the DRA fluid into the vertical hole in the port and up into suction check valve, therefore providing a more complete charge to the head of the pump during the suction stroke of the pump. This may promote a more complete and dynamic flush of the DRA product, and at the same time promote a more efficient charge to the pump head, both providing more consistent pump rates with minimal plugging.

Furthermore, the check valve design may be modified such that the ball seat of the valve is directly in contact with the port. This may eliminate an adaptor piece that was used on the old design to transition from the port to the seat. This improvement may, again, minimize plugging and promote a more thorough and complete charge of chemical to the pump head during the suction stroke of the pump. The hole in the valve seat and port may be the same size, and may be larger than the standard port to allow a better flow of DRA into the check valve and increase efficiency of the pump.

Furthermore, the improved check valve design may minimize seal failures and increase efficiency. The check valve may provide a slightly beveled valve seat for a floating ball. The valve may comprise only three pieces, namely a main body, a valve seat, and a stainless steel ball, and may eliminate the top and bottom adapter of the previous design. In addition, the main body may be constructed with a concave arrangement that allows more clearance, thus providing more cross sectional area for the DRA to pass the ball in the valve, which again may allow the valve to avoid plugging issues and valve failures.

Eliminating the adaptors on the check valve may additionally reduce gasket failures, thus minimizing the possibility of a leak. Specifically, where the old design had five gaskets, the current design may have only three gaskets.

Furthermore, the present design may ensure the even spacing of the all thread bolts, by using a pre-determined length sleeve arrangement, in this case a spring, that goes around the all thread and is used to properly align the port and valve with the pump head. This may ensure that the nuts and all thread bolts that are used to secure the port to the pump head and compress the valve are tightened to the same torque and same length. This may minimize any tilt or slant in the port and check valve that would create uneven pressure on the valve gaskets, as uneven pressure or misaligned bolts may promote leaks.

Whereas, the devices and methods have been described in relation to the drawings and claims, it should be understood that other and further modifications, apart from those shown or suggested herein, may be made within the spirit and scope of this invention.

What is claimed is:

1. A suction port and check valve assembly for use with a pump head, the assembly comprising:
 a port body with an inlet side, an outlet side, and a top, the port body comprising:
  a horizontal bore extending from the inlet side to the outlet side; and
  a vertical bore extending from the top to the horizontal bore; and
 a check valve comprising:
  a valve seat, where the valve seat rests atop the port body with only a gasket therebetween; and
  a valve body atop the valve seat;
 where the assembly attaches to the pump head via a plurality of all thread rods extending downward from the pump head, the assembly further comprising:
  a plurality of holes in the port body through which the all thread rods extend;
  a plurality of nuts threadably attached to the all thread rods below the port body to hold the port body in place relative to the pump head; and
  a plurality of alignment spacers capable of spacing the port body from the pump head such that the port body is properly aligned relative to the pump head.

2. The suction port and check valve assembly of claim 1 further comprising an adapter atop the valve body.

3. The suction port and check valve assembly of claim 2 where the adaptor and the valve body are integrally formed such that they are a single structural component.

4. The suction port and check valve assembly of claim 1 where the alignment spacers are springs surrounding the all thread rods between the port body and the pump head.

5. The suction port and check valve assembly of claim 1 where the horizontal bore of the port body has a smaller diameter at the outlet side than at the inlet side.

6. The suction port and check valve assembly of claim 5 where the port body comprises a shoulder in the horizontal bore located between the vertical bore and the outlet side.

* * * * *